No. 694,924.
Patented Mar. 4, 1902.
D. H. HOUSTON.
ROLL HOLDING CAMERA.
(Application filed Mar. 20, 1900.)
(No Model.)
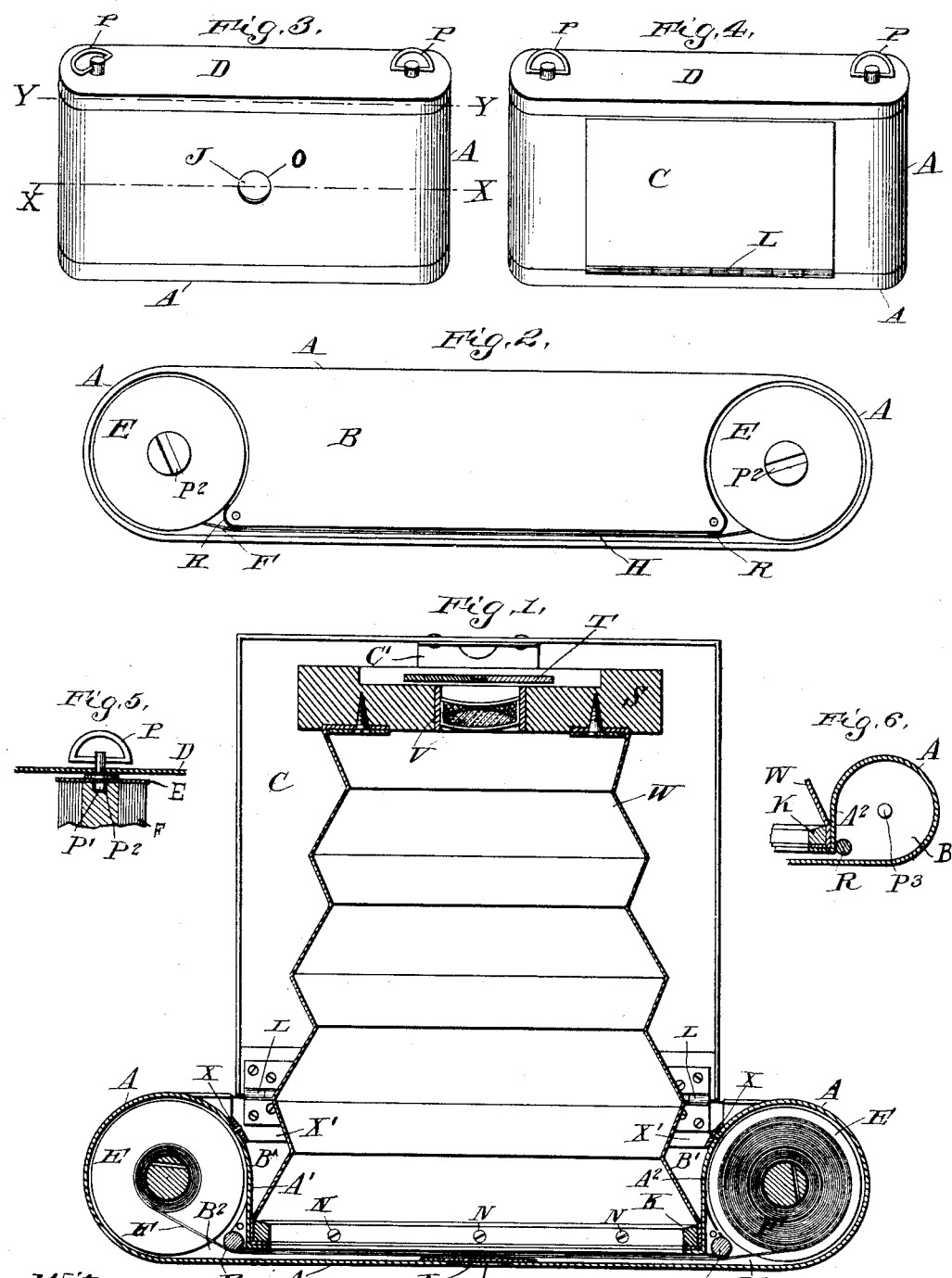

UNITED STATES PATENT OFFICE.

DAVID HENDERSON HOUSTON, OF HUNTER, NORTH DAKOTA.

ROLL-HOLDING CAMERA.

SPECIFICATION forming part of Letters Patent No. 694,924, dated March 4, 1902.

Application filed March 20, 1900. Serial No. 9,360. (No model.)

*To all whom it may concern:*

Be it known that I, DAVID HENDERSON HOUSTON, a citizen of the United States, residing at Hunter, in the county of Cass and State of North Dakota, have invented certain new and useful Improvements in Folding Roll-Holding Cameras; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in cameras, and provides a novel camera for using rolls of sensitized film which are on the market and are generally known as "film-cartridges," and which rolls of film can be inserted into the camera in daylight without the use of a room with non-actinic light.

An object of my invention is the production of a folding camera of a shape well adapted to carry in the pocket and being so constructed as to be of easy manufacture.

My invention consists of novel feature of construction and combination of parts which are pointed out in the claims.

In this specification similar characters of reference denote corresponding parts in all of the drawings.

Figure 1 represents a sectional plan view of my folding camera, taken through the center on the line X X of Fig. 3, but with the bellows extended and supported on the outward-folded front of the camera. Fig. 2 represents a view of the top of the central compartment of the camera, taken on the line Y Y of Fig. 3 with the bellows folded into the central compartment and the top cover of the camera removed, showing the passage-way across and through the top of the central compartment. Fig. 3 represents a diminished perspective view of the camera, taken from the rear side with the bellows and front folded into the central compartment. Fig. 4 represents a diminished perspective view of the camera, taken from the front side when the bellows and front are folded into the central compartment. Fig. 5 represents a sectional view showing the cross-head on the lower end of the reel and the supply-spool keys and the grooves in the ends of the reel and the supply-spool centers. Fig. 6 represents a sectional view showing the center pins, which are placed in the bottom of the spool-compartments of the camera-casing.

The side compartments $B^2$ and $B^3$ of my camera have their top ends open, and said open ends are connected together by a passage-way H across and through the top of the central compartment, and I provide a cover D over the open ends of the side compartments and over the passage-way in the top of the central compartment, this construction allowing the passage of the wrapper of the film through the passage-way H and into the rear interior part of the central compartment, and when the supply-spool and the reel-spool connected by the wrapper-paper are inserted the removable cover D is placed upon the camera-casing and forms a light-tight cover over the ends of the spool and reel compartments and also over the passage-way across and through the central compartment.

At $A'$ and $A^2$ are shown the turned-in parts of the sheet of material, which turned-in parts form the light-excluding divisions of the camera-casing, also two sides of the central compartment. The rear ends of the turned-in parts of the sheet of material are attached to the rear frame K of the bellows W, and the guide-rollers R R are placed in the side compartments approximately adjacent to the ends of the light-excluding divisions of the camera-casing.

E indicates the flanges of the spools.

F indicates the sensitized film.

L indicates the hinges of the folding front of the camera-casing.

X indicates the rivet in the turned corner of the plate $X'$.

The rear end of the bellows W is secured to the inner ends of the light-excluding divisions and also to the rear interior part of the central compartment under the rear frame K of the bellows W and is held in place by the screws N. The front end of the bellows is closed by the front S, carrying a lens and mount V and shutter T, the said front and bellows being adapted to fold into the central compartment of the camera. The front carrying the lens and shutter may be projected and supported as shown in the drawings, said front of the camera sliding upon a track C' upon the front C of the camera-casing. When the camera-front S and the bellows W are folded into the central compartment of the camera, the front C of the camera-casing may be folded upward to close the casing.

The spool and the reel-keys P pass through the cover D, and the ends of the key-shafts are provided with cross-heads P', adapted to unite with the grooves $P^2$ in the ends of the spool and reel centers of the film-cartridges and are so in a position to turn the said spool and reel in either direction, forward or backward, as desired by the operator, and the key ends are adapted to turn down and lie flat upon the casing. Spool and reel pivots $P^3$ are placed in the bottom of the spool and the reel compartments, upon which pivots the spool and the reel are placed.

In the rear side of the casing A is the sight-opening O, through which indicia on the wrapper superimposed upon the sensitized film may be seen, so that the operator can see when the exposed part of the sensitized film is in the central compartment. The sight-opening is covered with a thin sheet of transparent material J, such as celluloid, slightly colored to exclude actinic rays of light.

To operate the camera, turn the reel until the unexposed part of the film is in place in the central compartment. Then open the front of the casing and extend the bellows forward until the lens is in focal adjustment with the sensitized film. Then operate the camera in the usual manner.

I claim—

1. In a photographic camera, the combination of a casing having light-excluding divisions forming a central compartment and two open-ended side compartments, said casing being provided with an inner top over said central compartment, and with a passage-way formed between its rear side and said inner top and connecting said side compartments, a bellows connected at its rear end to said light-excluding divisions and to the interior of said central compartment, said bellows having its front end closed by a front board carrying a lens and shutter, said bellows and the parts carried thereby being adapted to be folded into said central compartments, a folding front on said casing adapted to support said front board and bellows when extended, and a light-tight cover adapted to close the open ends of said side compartments and said passage-way connecting them.

2. In a photographic camera, the combination of a casing having light-excluding divisions forming a central compartment and two open-ended side compartments, spool and reel pivoting devices positioned in the said side compartments, said casing being provided with an inner top over said central compartment and with a passage-way formed between its rear side and said inner top and connecting said side compartments, a light-tight cover adapted to close the said ends of said side compartments and said passage-way, a reel-winding device passing through the camera-casing and connecting with and adapted to wind the reel-spool, a bellows connected at its rear end to said light-excluding divisions and to the interior of said central compartment, said bellows having its front end closed by a front board carrying a lens and shutter, said bellows and the parts carried thereby being adapted to be folded into said central compartment, and a folding front on said casing adapted to support said front board and bellows when extended.

In testimony whereof I affix my signature in presence of two witnesses.

DAVID HENDERSON HOUSTON.

Witnesses:
GEO. M. COPENHAVER,
WM. H. DE LACY.